(12) United States Patent
Eguchi et al.

(10) Patent No.: US 12,195,828 B2
(45) Date of Patent: Jan. 14, 2025

(54) COBALT-BASED ALLOY PRODUCT AND METHOD FOR PRODUCING COBALT-BASED ALLOY PRODUCT

(71) Applicant: DAIDO STEEL CO., LTD., Nagoya (JP)

(72) Inventors: Shigenobu Eguchi, Tokyo (JP); Shinya Imano, Tokyo (JP); Atsuo Ota, Tokyo (JP); Kenji Sugiyama, Nagoya (JP); Yoshiki Kumagai, Nagoya (JP)

(73) Assignee: DAIDO STEEL CO., LTD., Nagoya-shi (JP)

( * ) Notice: Subject to any disclaimer, the term of this patent is extended or adjusted under 35 U.S.C. 154(b) by 0 days.

(21) Appl. No.: 17/954,052

(22) Filed: Sep. 27, 2022

(65) Prior Publication Data

US 2023/0094413 A1 Mar. 30, 2023

(30) Foreign Application Priority Data

Sep. 30, 2021 (JP) .................................. 2021-160757
Jun. 6, 2022 (JP) .................................. 2022-091284

(51) Int. Cl.
*C22C 19/07* (2006.01)
(52) U.S. Cl.
CPC .................................... *C22C 19/07* (2013.01)
(58) Field of Classification Search
CPC ......... C22F 1/10; C22C 19/07; C22C 19/056; B33Y 10/00; B33Y 40/20; B33Y 70/00; B23K 35/304
USPC ....................................................... 420/438
See application file for complete search history.

(56) References Cited

U.S. PATENT DOCUMENTS

| 2004/0076540 | A1 | 4/2004 | Imano et al. |
| 2013/0206287 | A1 | 8/2013 | Sato et al. |
| 2017/0342525 | A1* | 11/2017 | Takasawa ............. C22C 19/056 |
| 2019/0048451 | A1 | 2/2019 | Ota et al. |
| 2019/0076926 | A1 | 3/2019 | Imano et al. |

(Continued)

FOREIGN PATENT DOCUMENTS

| AU | 2018-422117 A1 | 6/2020 |
| CA | 3061851 A1 | 6/2020 |

(Continued)

OTHER PUBLICATIONS

NPL: on-line translation for CN 107012366 A, Aug. 2017 (Year: 2017).*

(Continued)

*Primary Examiner* — Jie Yang
(74) *Attorney, Agent, or Firm* — MCGINN I.P. LAW GROUP, PLLC

(57) ABSTRACT

The present invention relates to a Co-based alloy product including a polycrystal of a Co-based alloy, the Co-based alloy including: 0.001 mass %≤C<0.100 mass %; 9.0 mass %≤Cr<20.0 mass %; 2.0 mass %≤Al<5.0 mass %; 13.0 mass %≤W<20.0 mass %; and 39.0 mass %≤Ni<55.0 mass %, with the balance being Co and unavoidable impurities, in which the Co-based alloy product comprises segregated cells formed inside a crystal grain of the polycrystal, the segregated cells have an average size of 1 μm or larger and 100 μm or smaller, and the segregated cells contain Al and Cr, and a method for producing the Co-based alloy product.

13 Claims, 4 Drawing Sheets

(56) References Cited

U.S. PATENT DOCUMENTS

| | | |
|---|---|---|
| 2020/0016658 A1 | 1/2020 | Imano et al. |
| 2020/0016659 A1 | 1/2020 | Imano et al. |
| 2021/0340645 A1 | 11/2021 | Wang et al. |
| 2021/0355564 A1 | 11/2021 | Belaygue et al. |
| 2021/0363615 A1 | 11/2021 | Wang et al. |
| 2021/0404036 A1 | 12/2021 | Wang et al. |

FOREIGN PATENT DOCUMENTS

| | | |
|---|---|---|
| CN | 107012366 A | 8/2017 |
| CN | 108941588 A | 12/2018 |
| CN | 109385589 A | 2/2019 |
| CN | 109468495 A | 3/2019 |
| CN | 111455221 A | 7/2020 |
| CN | 111918976 A | 11/2020 |
| CN | 112004951 A | 11/2020 |
| CN | 112004952 A | 11/2020 |
| CN | 113166855 A | 7/2021 |
| CN | 113201667 A | 8/2021 |
| DE | 102019208246 A1 | 12/2020 |
| EP | 2610360 A1 * | 7/2013 ........... C22C 19/055 |
| JP | 2012-041627 A | 3/2012 |
| WO | 2020121367 A1 | 6/2020 |

OTHER PUBLICATIONS

Xiangfang Xu, et al.: Enhancing mechanical properties of wire + arc additively manufactured INCONEL 718 superalloy through in-process thermomechanical processing, Materials and Design, 160 (2018) 1042-1051.

Extended European Search Report issued Jan. 26, 2023 for European Patent Application No. 22199066.7-1103.

Corrected Extended European Search Report Issued Feb. 3, 2023 for European Patent Application No. 22199056.7-1103.

Chinese Office Action 202211202070.6 issued on Jan. 6, 2024 with English translation thereof.

Liang et al. "Research Status and Prospect of Cobalt based Superalloy Additive Manufacturing" Journal of Netsharp Forming Engineering vol. 10, Issue 5, Sep. 2018. pp. 102-106 with English translation thereof.

Chinese Office Action in CNA No. 202211202070.6 issued on Jul. 20, 2024 with English translation thereof.

* cited by examiner

COBALT-BASED ALLOY PRODUCT AND METHOD FOR PRODUCING COBALT-BASED ALLOY PRODUCT

TECHNICAL FIELD

The present invention relates to a cobalt-based alloy product and a method for producing the cobalt-based alloy product.

BACKGROUND ART

Cobalt(Co)-based alloy materials, along with nickel(Ni)-based alloy materials, are representative heat-resistant alloy materials and are also called superalloys, and are extensively used as high-temperature members for turbines (e.g., gas turbines and steam turbines). The Co-based alloy materials are excellent in corrosion resistance and wear resistance although higher in material cost than the Ni-based alloy materials, and are easy to cause solid-solution strengthening. Because of this, the Co-based alloy materials have been used as the stationary blades of turbines and members for burners.

Conventional Co-based alloy materials include, for example, one described in Patent Document 1. Patent Document 1 discloses a Co-based alloy having a composition which includes 0.001 mass %≤C<0.100 mass %, 9.0 mass %≤Cr<20.0 mass %, 2.0 mass %≤Al<5.0 mass %, 13.0 mass %≤W<20.0 mass %, and 39.0 mass %≤Ni<55 mass %, with the balance being Co and unavoidable impurities, and in which the contents of Mo, Nb, Ti, and Ta among the unavoidable impurities are Mo<0.010 mass %, Nb<0.010 mass %, Ti<0.010 mass %, and Ta<0.010 mass %. Patent Document 1 indicates that a Co-based alloy which has a higher high-temperature strength than conventional Co-based alloys and hot workability of equal to or higher than those of the conventional Co-based alloys and which is suitable for forging can be provided.

Patent Document 1: JP-A-2012-041627

Non-Patent Document 1: Xiangfang Xu, et al.: Enhancing mechanical properties of wire+arc additively manufactured INCONEL 718 superalloy through in-process thermomechanical processing, Material and Design, 160 (2018) 1042-1051

SUMMARY OF INVENTION

In recent years, additive manufacturing (AM) has come to be used in producing industrial products as a process capable of easily producing complicated shapes which are difficult to produce by conventional processing methods such as machining and casting. Among AM techniques, wire additive manufacturing (hereinafter referred to as "WAM") in which a wire is used as a feed material has advantages such as a high shaping speed, a low equipment cost, a satisfactory material yield, etc., and is receiving attention from industrial production divisions as a technique for producing large metallic members. For example, in Non-Patent Document 1, a shaping method in which an Ni-based alloy, e.g., INCONEL (registered trademark of Huntington Alloys Corporation) 718, is used is investigated in order to apply the WAM method to production of a high-temperature member of a turbine. However, the WAM-shaped article of the Ni-based alloy has a considerably reduced mechanical strength as compared with conventional Ni-based alloy forged materials, and sufficient properties have not been obtained. There is hence a desire for development of a WAM-shaped article which is not considerably lower in strength than conventional Ni-based alloy forged materials and Co-based alloy forged materials and is similar in high-temperature strength thereto.

An object of the present invention, in view of those circumstances, is to provide, through a WAM method, a Co-based alloy product which is not considerably lower in strength than products using conventional Ni-based alloy forged materials and Co-based alloy forged materials, which is similar in high-temperature strength to the products using conventional Ni-based alloy forged materials and Co-based alloy forged materials, and which attains an improvement in yield, and a method for producing the Co-based alloy product.

Namely, the present invention relates to the following configurations (1) to (20).

(1) A Co-based alloy product including a polycrystal of a Co-based alloy,
   the Co-based alloy including:
   0.001 mass %≤C<0.100 mass %;
   9.0 mass %≤Cr<20.0 mass %;
   2.0 mass %≤Al<5.0 mass %;
   13.0 mass %≤W<20.0 mass %; and
   39.0 mass %≤Ni<55.0 mass %,
   with the balance being Co and unavoidable impurities,
   in which the Co-based alloy product includes segregated cells formed inside a crystal grain of the polycrystal, the segregated cells have an average size of 1 μm or larger and 100 μm or smaller, and the segregated cells contain Al and Cr.

(2) The Co-based alloy product according to (1), in which the Co-based alloy further includes at least one element selected from the group consisting of:
   Mo≤3.0 mass %;
   Nb≤2.0 mass %;
   Ti≤2.0 mass %; and
   Ta≤2.0 mass %.

(3) The Co-based alloy product according to (1) or (2), in which the Co-based alloy further includes at least one element selected from the group consisting of:
   0.001 mass %≤B<0.020 mass %;
   0.0001 mass %≤Zr<0.010 mass %;
   Mg≤0.10 mass %; and
   Ca≤0.20 mass %.

(4) The Co-based alloy product according to (1) or (2), having a 0.2% proof stress at 800° C. of 650 MPa or higher.

(5) The Co-based alloy product according to (3), having a 0.2% proof stress at 800° C. of 650 MPa or higher.

(6) The Co-based alloy product according to (1) or (2), having a tensile strength at 800° C. of 850 MPa or higher.

(7) The Co-based alloy product according to (3), having a tensile strength at 800° C. of 850 MPa or higher.

(8) The Co-based alloy product according to (1) or (2), further including a γ' phase coherently precipitated inside the crystal grain.

(9) The Co-based alloy product according to (3), further including a γ' phase coherently precipitated inside the crystal grain.

(10) A method for producing the Co-based alloy product according to (1) or (2), the method including:
   a step of preparing a wire including the Co-based alloy;
   a step of subjecting the wire to an additive manufacturing to obtain a Co-based alloy shaped article;
   a step of subjecting the Co-based alloy shaped article to a solution heat treatment at a temperature of lower than 1,150° C.; and a step of performing an aging heat treatment after the solution heat treatment to obtain the Co-based alloy product.
(11) A method for producing the Co-based alloy product according to (3), the method including:
a step of preparing a wire including the Co-based alloy;
a step of subjecting the wire to an additive manufacturing to obtain a Co-based alloy shaped article;
a step of subjecting the Co-based alloy shaped article to a solution heat treatment at a temperature of lower than 1,150° C.; and
a step of performing an aging heat treatment after the solution heat treatment to obtain the Co-based alloy product.
(12) The method according to (10),
in which the Co-based alloy shaped article before the solution heat treatment includes segregated cells formed inside a crystal grain of a polycrystal, and the segregated cells have an average size of 1 µm or larger and 100 µm or smaller.
(13) The method according to (11),
in which the Co-based alloy shaped article before the solution heat treatment includes segregated cells formed inside a crystal grain of a polycrystal, and the segregated cells have an average size of 1 µm or larger and 100 µm or smaller.
(14) The method according to (12), in which the Co-based alloy product obtained by the aging heat treatment includes a γ' phase coherently precipitated inside the crystal grain.
(15) The method according to (13), in which the Co-based alloy product obtained by the aging heat treatment includes a γ' phase coherently precipitated inside the crystal grain.
(16) The method according to (10), in which the additive manufacturing employs an electron beam, a laser, or CMT as a heat source.
(17) The method according to (10), in which the solution heat treatment is performed at a temperature of 800° C. or higher and 1,050° C. or lower.
(18) The method according to (11), in which the solution heat treatment is performed at a temperature of 800° C. or higher and 1,050° C. or lower.
(19) The method according to (10), in which in the aging heat treatment, the Co-based alloy shaped article is heled at 900° C. for 24 hours and then held at 800° C. for 24 hours.
(20) The method according to (11), in which in the aging heat treatment, the Co-based alloy shaped article is heled at 900° C. for 24 hours and then held at 800° C. for 24 hours.

The present invention can provide a Co-based alloy product which is not considerably lower in strength than products using conventional Ni-based alloy forged materials and Co-based alloy forged materials and comes to have equal or superior high-temperature strength to the products using conventional Ni-based alloy forged materials and Co-based alloy forged materials, and a method for producing the Co-based alloy product.

Problems, configurations, and effects other than those mentioned above will become apparent from the following description of embodiments.

DESCRIPTION OF EMBODIMENTS

Figure 1:
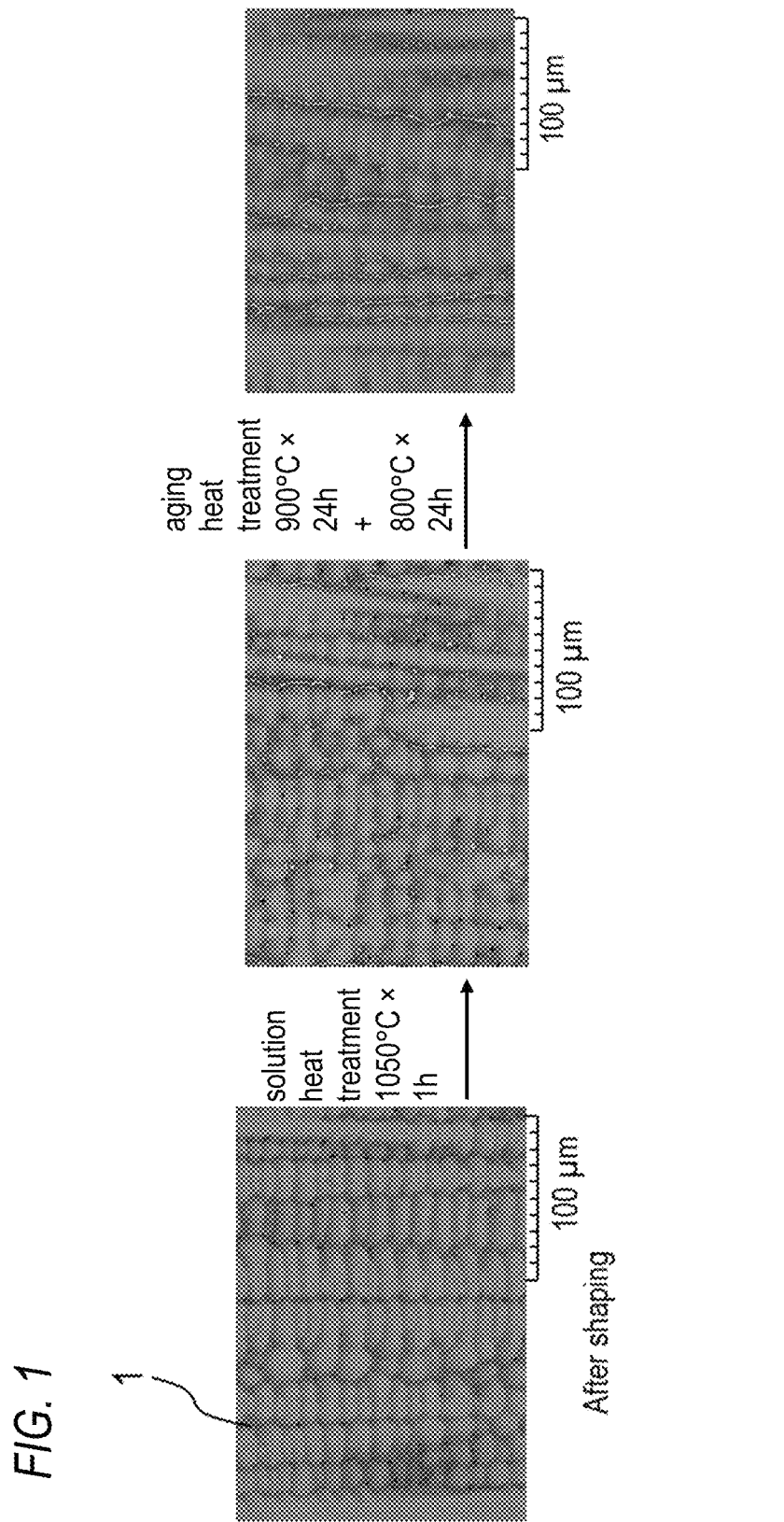
FIG. 1 is SEM (Scanning Electron Microscope) observation photographs showing a structure after shaping (heat source: Cold Metal Transfer (CMT)) a Co-based alloy, a structure after a solution heat treatment and a structure after an aging heat treatment.

The Co-based alloy product according to the present invention and the method for producing the Co-based alloy product are explained below in accordance with the flow of the production method. In this specification, "Co-based alloy shaped article" means a shaped article, which is obtained by subjecting a Co-based alloy wire to an additive manufacturing and is not subjected to a heat treatment, and "Co-based alloy product" means an object obtained by subjecting the Co-based alloy shaped article to a solution heat treatment and an aging heat treatment.

As stated above, the method for producing the Co-based alloy product according to the present invention includes (1) a step of preparing a wire including the Co-based alloy, (2) a step of subjecting the wire to the additive manufacturing to obtain a Co-based shaped alloy (additive manufacturing step), (3) a step of subjecting the Co-based alloy shaped article to the solution heat treatment at the temperature of lower than 1,150° C. (solution heat treatment step), and (4) a step of performing the aging heat treatment after the solution heat treatment, to obtain the Co-based alloy product (aging heat treatment step). Each step is described in detail below.

(1) Preparation of Co-Based Alloy Wire

The Co-based alloy according to the present invention, which is included in the wire to be subjected to the wire additive manufacturing and which is included in a Co-based alloy product, has a composition including the following elements, with the balance being Co and unavoidable impurities. The kinds of additive elements, the ranges of contents of the components, and reasons for limiting the content ranges are as follows.

(a) 0.001 Mass %≤C<0.100 Mass %

C combines with W and Cr and thus contributes to the formation of carbides in grains and at grain boundaries. The precipitation of grain-shaped carbides at the grain boundaries is effective in mainly strengthening the grain boundaries and improves the hot workability and the high-temperature strength. The improvement in grain-boundary strength especially improves elongation and reduction of area at high temperature and is hence highly effective in improving the tensile properties and creep rupture properties. For obtaining such effects, the content of C needs to be 0.001 mass % or higher. The content of C is preferably 0.005 mass % or higher.

Meanwhile, in the case where the content of C is too high, the strength properties are reduced by an increase in intragranular strength due to the enhanced formation of carbides in the grains and by the precipitation of film-shaped carbides at the grain boundaries. Consequently, the content of C needs to be less than 0.100 mass %. The content of C is preferably less than 0.050 mass %.

A great feature of the Co-based alloy according to the present invention is that carbides having an optimal shape are precipitated by optimizing the content of C as well as the content of Cr and the content of W to thereby enhance high-temperature ductility and attain remarkable improvement in properties. The term "carbides" herein means the whole of various carbides each including C and either Cr and/or W as main components.

(b) 9.0 Mass %≤Cr<20.0 Mass %

Cr combines with O to form a dense $Cr_2O_3$ layer as a surface layer and is hence effective in improving the oxidation resistance. In the case where the content of Cr is too low, the formation of the dense $Cr_2O_3$ layer is difficult and sufficient oxidation resistance is not obtained. Cr combines also with C to form various carbides in the grains and at the grain boundaries and hence contributes to improvements in hot workability and high-temperature ductility. For obtaining such effects, the content of Cr needs to be 9.0 mass % or higher. The content of Cr is preferably 10.0 mass % or higher, more preferably 10.5 mass % or higher.

Meanwhile, in the case where the content of Cr is too high, this is causative of a decrease in melting point and a decrease in high-temperature mechanical property. Consequently, the content of Cr needs to be less than 20.0 mass %. The content of Cr is preferably less than 19.5 mass %, more preferably less than 18.5 mass %.

One of great features of the Co-based alloy according to the present invention is that carbides having an optimal shape are precipitated by optimizing the content of Cr to thereby attain a remarkable improvement in high-temperature ductility.

(c) 2.0 Mass %≤Al<5.0 Mass %

Al is an element which stabilizes an $L_{12}$-type intermetallic compound phase (γ' phase) of $Co_3(Al,W)$, and is an element necessary for causing the γ' phase, which is a metastable phase, to precipitate as a stable phase to improve the high-temperature strength properties. In the case where the content of Al is too low, the γ' phase cannot be formed in an amount sufficient for improving the strength properties. Al is also an element which improves the oxidation resistance, like Cr, by forming $Al_2O_3$. For obtaining such effects, the content of Al needs to be 2.0 mass % or higher. The content of Al is preferably 2.5 mass % or higher, more preferably 3.0 mass % or higher.

Meanwhile, in the case where the content of Al is too high, this is causative of a decrease in melting point and a decrease in high-temperature properties (hot workability and high-temperature ductility). Consequently, the content of Al needs to be less than 5.0 mass %. The content of Al is preferably less than 4.5 mass %, more preferably less than 4.3 mass %.

The term "$L_{12}$-type intermetallic compound phase (γ' phase) of $Co_3(Al,W)$" also means the γ' phase in which some of the Co sites and/or (Al,W) sites have been replaced by other element(s) as well as the γ' phase consisting of Co, Al, and W.

(d) 13.0 Mass %≤W<20.0 Mass %

W is an element which stabilizes the $L_{12}$-type intermetallic compound phase (γ' phase) of $Co_3(Al,W)$, and is an element necessary for forming the γ' phase, which is effective for high-temperature strength. In the case where the content of W is too low, the γ' phase cannot be formed in an amount sufficient for improving the strength. W combines with C to form various carbides. The precipitation of grain-boundary carbides is effective in improving the high-temperature strength properties, especially high-temperature ductility (elongation and reduction of area). For obtaining such effects, the content of W needs to be 13.0 mass % or higher. The content of W is preferably 14.5 mass % or higher, more preferably 15.0 mass % or higher.

Meanwhile, in the case where the content of W is too high, the W forms harmful phases, which are represented by a μ phase shown by $A_7B_6$, in the grains and at the grain boundaries, resulting in a considerable decrease in hot workability. Consequently, the content of W needs to be less than 20.0 mass %. The content of W is preferably less than 19.0 mass %, more preferably less than 18.0 mass %.

The "$A_7B_6$ compounds (μ phase)" are compounds derived from $Co_7W_6$, and these compounds include also ones in which some of the A sites (Co sites) have been replaced by Ni, Cr, Al, Fe, etc. and some of the B sites (W sites) have been replaced by Ta, Nb, Ti, Zr, etc.

(e) 39.0 Mass %≤Ni<55.0 Mass %

Ni replaces Co sites to form an $L_{12}$-type intermetallic compound phase of $(Co,Ni)_3(Al,W)$. Ni is distributed equally to the matrix phase γ and the strengthening phase γ'. Especially, in the case where some of the Co sites of the γ' phase have been replaced by Ni, this γ' phase has an elevated solid-solution temperature to improve the high-temperature strength properties. For obtaining such effects, the content of Ni needs to be 39.0 mass % or higher. The content of Ni is preferably 41.0 mass % or higher, more preferably 43.0 mass % or higher.

Meanwhile, in the case where the content of Ni is too high, the matrix phase γ has a lowered melting point, resulting in a decrease in hot workability. Consequently, the content of Ni needs to be less than 55.0 mass %. The content of Ni is preferably less than 52.0 mass %, more preferably less than 50.0 mass %.

(f) Mo≤3.0 Mass %

Mo stabilizes the μ phase as well as contributing to the solid-solution strengthening of the γ phase as the matrix phase. It is hence effective to add Mo together with W. However, too high contents thereof reduce the oxidation resistance. In view of these, the content of Mo is preferably in the range of 3.0 mass % or less.

(g) Nb≤2.0 Mass %

(h) Ta≤2.0 Mass %

Nb and Ta stabilize γ'-$(Ni,Co)_3(Al,W,Ti,Nb,Ta)$. However, excessive inclusion thereof causes intermetallic compound δ-$Ni_3(Nb,Ta)$ to precipitate in a plate form at the grain boundaries, resulting in a decrease in creep strength. In view of these, the content of Nb and the content of Ta are each preferably in the range of 2.0 mass % or less.

(i) Ti≤2.0 Mass %

Ti, like Nb and Ta, stabilizes γ'-$(Ni,Co)_3(Al,W,Ti,Nb,Ta)$. However, excessive inclusion thereof causes intermetallic compound η-$Ni_3Ti$ to precipitate in the plate form at the grain boundaries, resulting in a decrease in creep strength. In view of these, the content of Ti is preferably in the range of 2.0 mass % or less.

The Co-based alloy according to the present invention may further include one or more of the following elements besides the elements described above. The kinds of optional additive elements, the ranges of the contents of the components, and reasons for limiting the content ranges are as follows.

(j) 0.001 Mass %≤B<0.020 Mass %

(k) 0.0001 Mass %≤Zr<0.010 Mass %

B and Zr each act as an element for strengthening the grain boundaries and contribute to an improvement in hot workability. From the standpoint of obtaining such effects, the content of B is preferably 0.001 mass % or higher, and the content of Zr is preferably 0.0001 mass % or higher.

Meanwhile, in the case where the content of B or Zr is too high, this results in a decrease in workability. Consequently, the content of B is preferably less than 0.020 mass % and the content of Zr is preferably less than 0.010 mass %.

(1) Mg≤0.10 Mass %
(m) Ca≤0.20 Mass %

Mg and Ca each pin S to contribute to an improvement in hot workability. From the standpoint of obtaining such effect, it is preferred to add Mg and Ca.

Meanwhile, in the case where the content of Mg or Ca is too high for the content of S, compounds of Mg or Ca are formed and this is causative of a decrease in workability. Consequently, the content of Mg is preferably 0.10 mass % or less and the content of Ca is preferably 0.20 mass % or less.

Here, in the Co-based alloy according to the present invention, the balance except for elements above is Co and unavoidable impurities. The components described below may be contained as unavoidable impurities. Examples of unavoidable impurities include Si≤0.60 mass %, Mn≤0.50 mass %, Fe≤1.0 mass % and S≤0.010 mass %.

S is segregated in the grain boundary, resulting in a remarkable decrease in hot workability. Consequently, the content of S is preferably 0.010 mass % or less.

Excessive inclusions of Si and Mn result in decrease in hot workability. Consequently, the contents of Si and Mn is preferably Si≤0.60 mass % and Mn≤0.50 mass %, respectively.

In another embodiment of the present invention, Fe may be contained at the content of less than 5.0 mass % in addition to the above described components of the above embodiment. Fe is effective in reducing cost because Fe has the same effect as Co by replacing with Co. However, excessive inclusion of Fe results in decrease in crepe strength and oxidation resistance. Consequently, in the case where Fe may be contained, the content of Fe is preferably less than 5.0 mass %, further preferably 1.0 mass % or less.

(2) Additive Manufacturing Step

As a heat source for the wire additive manufacturing using the Co-based alloy wire, use may be made of any of an electron beam, a laser, or CMT (cold metal transfer). Conditions for the additive manufacturing are not particularly limited so long as the structure of the Co-based alloy which will be described later can be obtained. In the case of using an electron beam, the output of the heat source is preferably 42 kW or less and the shaping speed is preferably 3.18 kg/hr or higher and 11.34 kg/hr or lower. In the case of using CMT, the output of the heat source is preferably 42.6 W or larger and 28.75 kW or lower and the shaping speed is preferably 1.6 kg/hr or larger and 3.5 kg/hr or lower.

Whichever heat source is employed, it is preferred to control the step so that the output P (kW) of the heat source and the additive manufacturing amount V (kg/hr) per unit time period have a relationship satisfying $0.0426 < P < 42$ and $1.6 < V < 11.34$.

It is preferable that the Co-based alloy shaped article after the additive manufacturing include a structure formed through melting and solidification, in which segregated cells having an average size of 1 μm or larger and 100 μm or smaller is formed in the crystal grains of the matrix phase (γ phase), which is polycrystal. The average size of the segregated cells is a value obtained by selecting ten segregated cells from an observation photograph taken with an SEM (scanning electron microscope) and averaging the lengths of the segregated cells. The segregated cells in the present invention mean cells including at least one of a structure in the process of forming dendrite-like structure or a dendrite structure, these structures being formed during the melting and solidification in the additive manufacturing. In an observation photograph taken with an SEM, there is a difference in lightness/darkness between the inside of the cells and the boundary region between the cells; the term "segregated cells" means either portions having a dark color or regions surrounded by light-color portions. The difference in lightness/darkness in the SEM observation photograph means that there is a difference between an average composition of the inside of the cells and an average composition of the boundary region. Thus, in the segregated cells, given alloying components localize in the inside of the cells and at the boundary region.

(3) Solution Heat Treatment Step

After the shaping the Co-based alloy shaped article, a solution heat treatment is conducted. With respect to heat treatment conditions, it is preferred to conduct the treatment at a temperature above which the residual stress after the shaping is sufficiently released and which the segregated cells do not disappear. Specifically, the temperature is lower than 1,150° C., preferably 800° C. or higher and lower than 1,150° C., more preferably 800° C. or higher and 1,050° C. or lower, further preferably 800° C. or higher and 1,000° C. or lower. A time period is preferably decided in accordance with the heat treatment temperature. One example of the heat treatment conditions can be such that the shaped article is held at 1,050° C. for 2 hours.

(4) Aging Heat Treatment Step

After the solution heat treatment step, an aging heat treatment step is conducted. Conventional heat treatment conditions can be used as the aging heat treatment conditions and the aging heat treatment can be conducted at a temperature of 500° C. or higher and 1,100° C. or lower for from 1 hour to 100 hours. Two-stage aging may be performed in which two temperatures are used. In the preset embodiment, one example of the heat treatment conditions can be such that the shaped article is held at 900° C. for 24 hours and then held at 800° C. for 24 hours.

After the aging heat treatment, the Co-based alloy product according to the present invention is obtained. As a result of the aging heat treatment, the γ' phase coherently precipitates in the crystal grains of the γ phase, which is the matrix phase of the Co-based alloy, to constitute a precipitation strengthening mechanism as in the alloy of Patent Document 1 described above.

According to the method for producing the cobalt-based alloy product according to the present invention, additive manufacturing can be conducted using a material having high-temperature strength. In the case of producing a member using the shaped article, it is possible to considerably diminish the processing allowance (e.g., the portion to be discarded in machining as machining wastage powder) as compared with production from forged materials. Consequently, productivity can be enhanced and an improvement in yield can be attained.

EXAMPLES

The Co-based alloy products according to the present invention (Examples 1 to 6), a product using a conventional Co-based alloy forged material (Comparative Example 4), products using conventional Ni-based alloy shaped articles (Comparative Examples 1 and 2), and a product using a conventional Ni-based alloy forged material (Comparative Example 3) were evaluated for high-temperature strength. In Table 1 are shown the alloy compositions (mass %) of Examples 1 to 6 and Comparative Examples 1 to 4. The alloy compositions of Examples 1 to 6 and Comparative Example 4 are COWALOY (registered trademark of Daido Steel Co., Ltd.), those of Comparative Examples 1 and 2 are INCONEL 625 and INCONEL 718, respectively, and that of Comparative Example 3 is WASPALOY (registered trademark of United States Technologies, Inc.).

TABLE 1

| | Alloy | Ni | Cr | Mo | W | Ti | Nb + Ta | Al | Fe | C | Si | Mn | Co |
|---|---|---|---|---|---|---|---|---|---|---|---|---|---|
| Example 1 | COWALOY | 48.30 | 14.30 | — | 16.97 | 0.01 | — | 3.64 | 0.29 | 0.011 | 0.03 | — | bal. |
| Example 2 | | 47.36 | 14.73 | — | 16.37 | — | — | 3.65 | — | 0.014 | 0.04 | — | bal. |
| Example 3 | | 47.54 | 15.20 | 2.48 | 13.00 | — | — | 3.70 | 0.10 | 0.010 | 0.04 | 0.03 | bal. |
| Example 4 | | 47.49 | 15.00 | — | 16.01 | — | Nb: 1.50 | 2.51 | — | 0.011 | 0.04 | 0.05 | bal. |
| Example 5 | | 47.53 | 15.00 | — | 15.98 | 1.30 | — | 2.00 | 0.48 | 0.012 | 0.04 | 0.04 | bal. |
| Example 6 | | 47.52 | 15.00 | — | 16.04 | — | Ta: 1.28 | 2.61 | — | 0.015 | 0.02 | 0.05 | bal. |
| Comparative Example 1 | INCONEL625 | bal. | 20.00 to 23.00 | 8.00 to 10.00 | — | <0.4 | 3.15 to 4.15 | <0.4 | 5.00 | <0.10 | <0.50 | <0.50 | <1.00 |
| Comparative Example 2 | INCONEL718 | 53.15 | 19.42 | 2.95 | — | 0.96 | 5.22 | 0.47 | bal. | — | — | 0.11 | 0.41 |
| Comparative Example 3 | WASPALOY | bal. | 19.50 | 4.30 | — | 2.00 | — | 1.30 | — | 0.08 | — | — | 13.5 |
| Comparative Example 4 | COWALOY | 47.50 | 15.00 | — | 16.00 | — | — | 3.70 | — | 0.01 | — | — | bal. |

The shaped articles or forged materials of Examples 1 to 6 and Comparative Examples 1 to 4 were each subjected to the solution heat treatment and the aging heat treatment. Conditions for each heat treatment are shown in Table 2. In Example 1, the Co-based alloy shaped article shaped with an electron beam was subjected to the solution heat treatment and the aging heat treatment. In Examples 2 to 6, the Co-based alloy shaped articles shaped by CMT were each subjected to the solution heat treatment and the aging heat treatment. In Comparative Examples 1 and 2, WAM-shaped articles of INCONEL 625 and INCONEL 718 were each subjected to the solution heat treatment and the aging heat treatment. In Comparative Examples 3 and 4, forged materials of WASPALOY and COWALOY were each subjected to the solution heat treatment and the aging heat treatment. The reason why the Comparative Examples differed from the Examples in heat treatment conditions is that the solid-solution temperature of the strengthening phase and conditions necessary for stress removal vary depending on the alloy composition. The heat-treatment conditions shown in Table 2 are ones suitable for each of the alloy compositions.

TABLE 2

| | Alloy | Production method | Solution heat treatment | First aging heat treatment | Second aging heat treatment |
|---|---|---|---|---|---|
| Example 1 | COWALOY | WAM | 1050° C. × 2 h | 900° C. × 24 h | 800° C. × 24 h |
| Example 2 | COWALOY | WAM | | | |
| Example 3 | COWALOY | WAM | 1100° C. × 1 h | | |
| Example 4 | COWALOY | WAM | 1050° C. × 2 h | | |
| Example 5 | COWALOY | WAM | 1100° C. × 1 h | | |
| Example 6 | COWALOY | WAM | 1100° C. × 1 h | | |
| Comparative Example 1 | INCONEL625 | WAM | 800° C. × 4 h | — | — |
| Comparative Example 2 | INCONEL718 | WAM | 970° C. × 1 h | 718° C. × 8 h | 620° C. × 8 h |
| Comparative Example 3 | WASPALOY | forging | 1080° C. × 4 h | 840° C. × 24 h | 760° C. × 16 h |
| Comparative Example 4 | COWALOY | forging | 1150° C. × 1 h | 900° C. × 24 h | 800° C. × 24 h |

[Observation of Microstructure]

Figure 2:
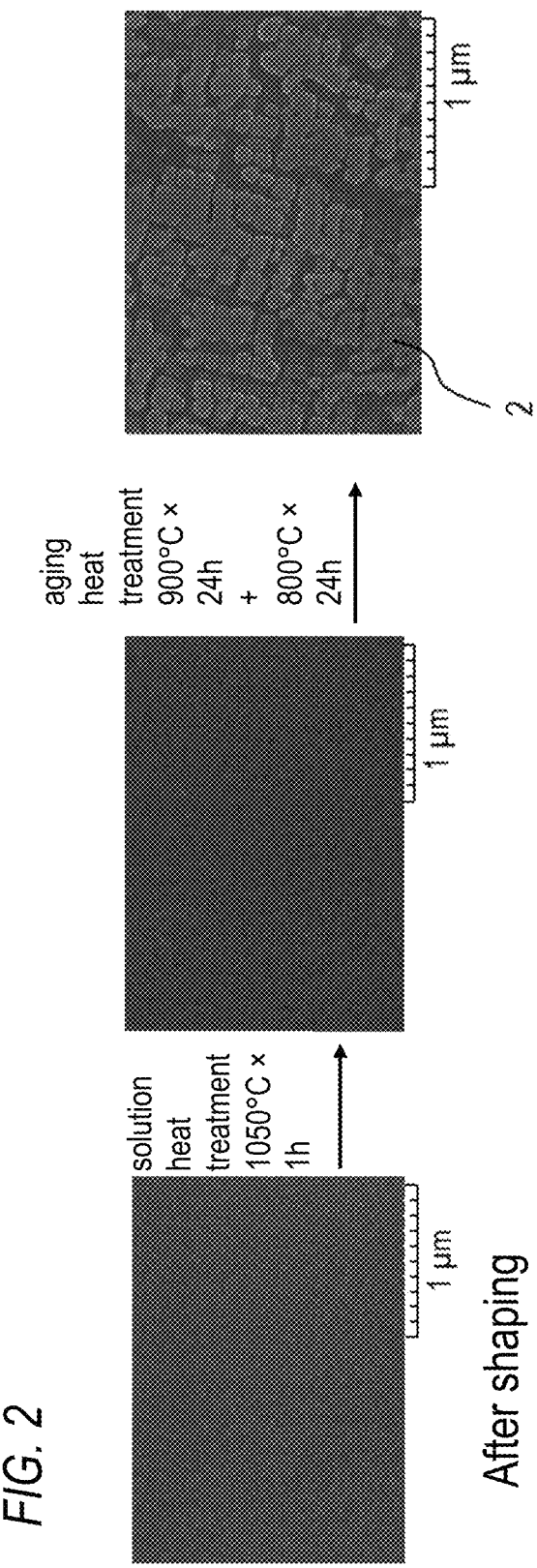
FIG. 2 is SEM observation photographs showing a structure after shaping (heat source: CMT) a Co-based alloy, a structure after a solution heat treatment and a structure after an aging heat treatment.

FIG. 1 and FIG. 2 are SEM observation photographs showing a structure after shaping (heat source: CMT) the Co-based alloy of Example 2 of the present invention, a structure after the solution heat treatment and a structure after the aging heat treatment. In FIG. 1 and FIG. 2, the light-gray portions are Co, Ni and W, and the dark-gray portions are Al and Cr. These components can be detected by mapping from a backscattered electron image.

As FIG. 1 shows, the structure after the shaping included a structure formed through melting and solidification and included segregated cells 1 having an average size of 1 μm or larger and 100 μm or smaller in the crystal grains of the matrix phase (γ phase), which are the polycrystal. The segregated cells are a characteristic structure which appears in the shaped article obtained by subjecting the Co-based alloy material to the wire additive manufacturing. At the boundaries between the segregated cells 1, Cr carbides had precipitated. Segregated cells 1 were observed also in the crystalline structures after the solution heat treatment and after the aging heat treatment. Furthermore, as shown in FIG. 2, which has a higher magnification than FIG. 1, the γ' phase 2 coherently precipitated in the matrix phase of the Co-based alloy was observed after the aging heat treatment. Segregated cells 1 similar to those of Example 2 and the γ' phase 2 precipitated after the aging heat treatment were observed also in the Co-based alloy shaped articles of Examples 3 to 6 (heat source: CMT).

Figure 3:
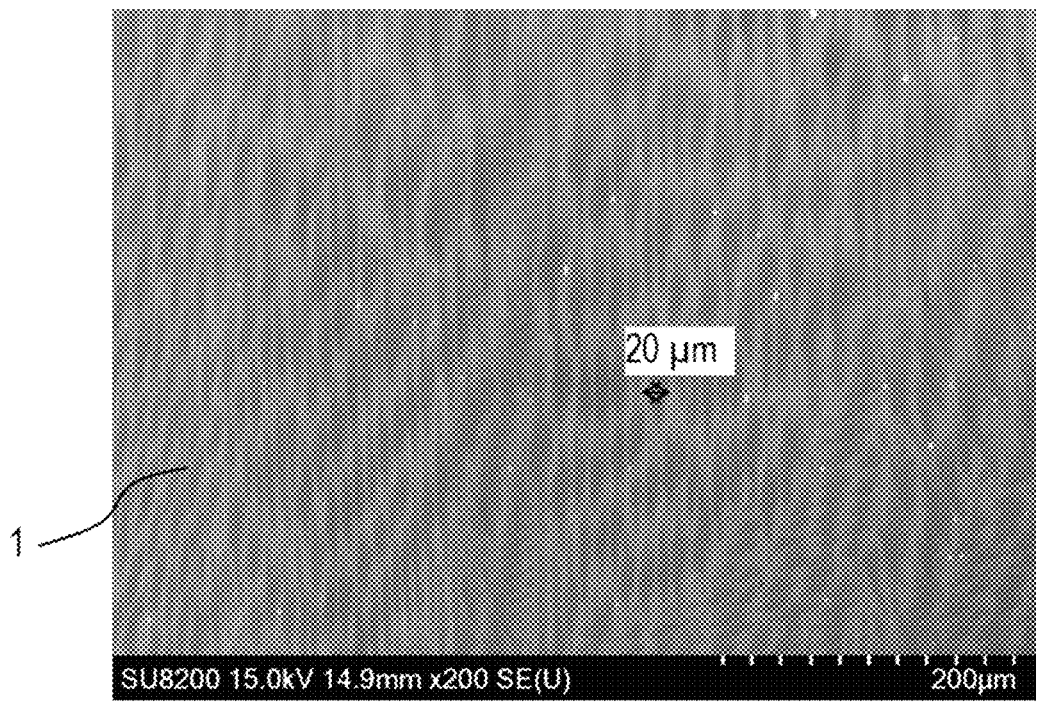
FIG. 3 is an SEM observation photograph showing a structure after shaping (heat source: electron beam) a Co-based alloy.
Figure 4:
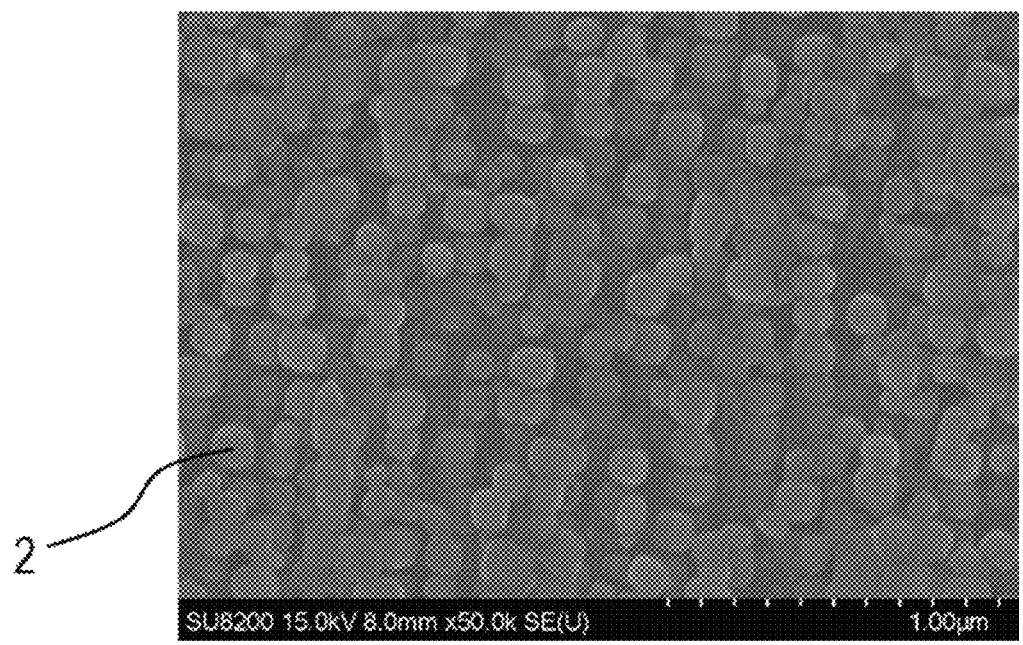
FIG. 4 is an SEM observation photograph showing a structure obtained by performing a solution heat treatment and an aging heat treatment after shaping (heat source: electron beam) a Co-based alloy.

FIG. 3 and FIG. 4 are SEM observation photographs showing the structure after shaping (heat source: electron beam) the Co-based alloy of Example 1 of the present invention (FIG. 3), and the structure after solution heat treatment and aging heat treatment (FIG. 4). As FIG. 3 shows, segregated cells 1 were observed in the crystalline structure after the shaping in which an electron beam was used as a heat source, as in the case where CMT was used. Segregated cells 1 were observed also in the crystalline structure after the solution heat treatment and the aging heat treatment. Furthermore, as shown in FIG. 4, the γ' phase 2 was observed after the aging heat treatment. The segregated cells 1 had a shape different from that in the case of CMT, and this is attributable to the different heat sources.

Comparative Examples 1 and 2 are WAM-shaped articles produced using the electron beam as a heat source. As in the WAM-shaped articles according to the present invention, the presence of the dendrite structure (segregated cells) formed through melting and solidification was observed in Comparative Examples 1 and 2. However, because of the differences in alloy composition, the γ' phase was not observed after the aging heat treatment in Comparative Examples 1 and 2. Meanwhile, in Comparative Examples 3 and 4, the articles were produced by forging, and the segregated cells according to the present invention were not observed.

Figure 5:
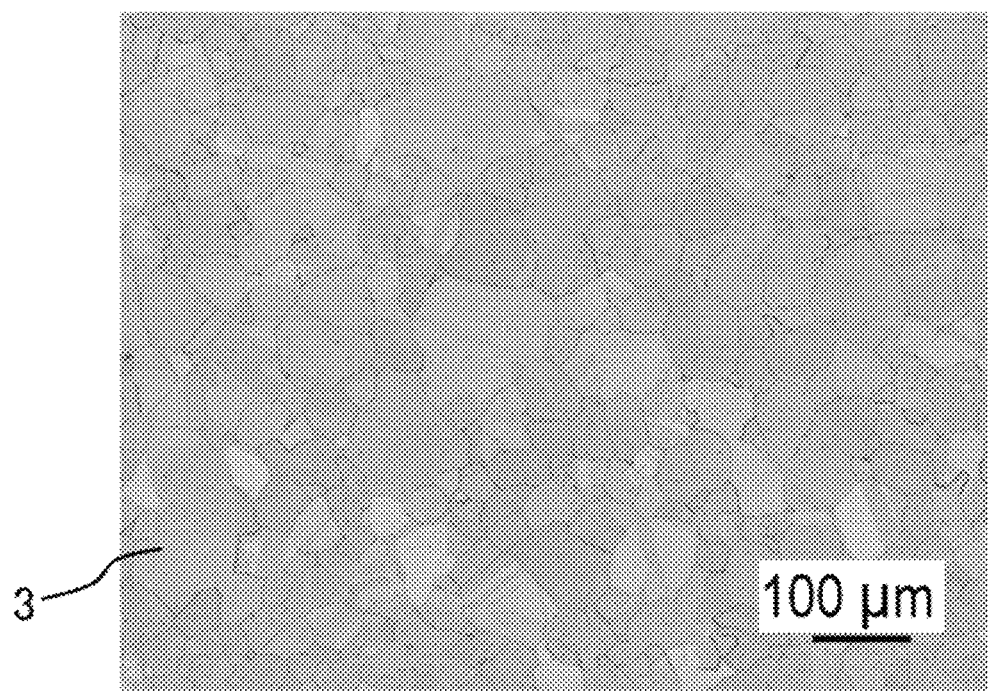
FIG. 5 is a microstructure photograph taken with an optical microscope, the photograph showing a structure obtained by performing a solution heat treatment and an aging heat treatment after forging a Co-based alloy.

For reference, a microstructure photograph of the forged product (structure obtained by performing the solution heat treatment and the aging heat treatment after the forging) taken with an optical microscope is shown in FIG. 5. It can be seen that a forged structure 3 had been formed and that it was different from the segregated cells according to the present invention.

Next, the following test was performed in order to evaluate high-temperature strength.

[Tensile Test]

Test specimens having a test-portion diameter of 8 mm and a length of 90 mm were cut out of each product. These test specimens were subjected to tensile tests at room temperature and at 800° C. to measure 0.2% proof stress, tensile strength, and elongation at rupture. The results of the evaluation by these tests are shown in Table 3. Incidentally, the results of Comparative Example 2 are ones given in Non-Patent Document 1, but no values of the 800° C. evaluation are shown in Table 3 because the document contains no results thereof.

As compared with the product using the forged material of Comparative Example 3, the Examples other than Example 5 had lower room-temperature 0.2% proof stresses and Examples 1 to 6 each had a lower room-temperature tensile strength than Comparative Example 3. As compared with the product using the forged material of Comparative Example 4, Examples 1 to 6 had room-temperature 0.2% proof stresses lower by 130 MPa at most and had room-temperature tensile strengths lower by 259 MPa at most (each difference being between Comparative Example 4 and Example 6). However, with respect to 0.2% proof stress at 800° C. and tensile strength at 800° C., Examples 1 to 6 were higher in 0.2% proof stress and tensile strength than the product using the forged material of Comparative Example 3. As compared with the product using the forged material of Comparative Example 4, the difference in 0.2% proof stress at 800° C. was 98 MPa at most and the difference in tensile strength at 800° C. was 57 MPa at most (each difference being between Comparative Example 4 and Example 3), showing that these differences were smaller than those in value at room temperature.

It was seen that the Co-based alloy products (products using WAM-shaped articles of COWALOY) according to the present invention had strengths (0.2% proof stress, tensile strength) at room temperature which were slightly lower than those of the product using the conventional forged COWALOY material but were higher than those of the products using the shaped articles of INCONEL 625 and INCONEL 718. With respect to strengths at 800° C., it was seen that high-temperature strengths equal to or higher than those of the product using the conventional Ni-based (WASPALOY) alloy forged material and the product using

TABLE 3

|  | Alloy | Production method | Room temperature | | | 800° C. | | |
|---|---|---|---|---|---|---|---|---|
|  |  |  | 0.2% proof stress MPa | Tensile strength MPa | Elongation % | 0.2% proof stress MPa | Tensile strength MPa | Elongation % |
| Example 1 | COWALOY | WAM | 831 | 1105 | 21.9 | 657 | 870 | 24.3 |
| Example 2 | COWALOY | WAM | 836 | 1136 | 26.2 | 666 | 903 | 34.6 |
| Example 3 | COWALOY | WAM | 825 | 1098 | 23.1 | 652 | 853 | 25.0 |
| Example 4 | COWALOY | WAM | 840 | 1110 | 21.0 | 660 | 872 | 26.0 |
| Example 5 | COWALOY | WAM | 858 | 1153 | 20.6 | 671 | 911 | 25.2 |
| Example 6 | COWALOY | WAM | 820 | 1091 | 22.5 | 653 | 861 | 26.3 |
| Comparative Example 1 | INCONEL625 | WAM | 665 | 409 | 28 | 432 | 250 | 78.3 |
| Comparative Example 2 | INCONEL718 | WAM | 791 | 988 | 12.8 | — | — | — |
| Comparative Example 3 | WASPALOY | forging | 850 | 1270 | 28 | 550 | 750 | 22 |
| Comparative Example 4 | COWALOY | forging | 950 | 1350 | 20 | 750 | 910 | 30 |

As Table 3 shows, it can be seen that the Co-based alloy products of Examples 1 to 6 of the present invention had higher 0.2% proof stresses at room temperature and 800° C. and tensile strengths at room temperature and 800° C. than the products of Comparative Examples 1 and 2. The reason why the Co-based alloy products according to the present invention were higher in strength than Comparative Examples 1 and 2 is that the γ' phase constituting a precipitation strengthening mechanism had coherently precipitated in the crystal grains of the γ phase which is the matrix phase of the Co-based alloy.

the Co-based alloy (COWALOY) forged material were able to be ensured.

As described above, it was demonstrated that the present invention can provide a Co-based alloy product and a method for producing the Co-based alloy product using WAM, the Co-based alloy product being not considerably lower in strength than products using conventional forged Ni-based alloy materials and forged Co-based alloy materials and being equal or superior in high-temperature strength to the products using conventional forged Ni-based alloy materials and forged Co-based alloy materials, and the production method attaining an improvement in yield.

The present invention is not limited to the Examples given above and includes various modifications. For example, the Examples are for explaining the present invention in detail for an easy understanding, and the present invention is not limited to embodiments including all the configurations described therein. It is possible to replace some of the configuration of an Example by the configuration of another Example, and it is also possible to add the configuration of an Example to the configuration of another Example. Furthermore, with respect to some of the configuration of each Example, another configuration can be added, eliminated, or replaced.

The present application is based on Japanese Patent Applications No. 2021-160757 filed on Sep. 30, 2021 and No. 2022-091284 filed on Jun. 6, 2022, the disclosure of which is incorporated herein by reference.

1: segregated cell formed in matrix phase of Co-based alloy
2: γ' phase coherently precipitated in matrix phase of Co-based alloy
3: forged structure.

What is claimed is:

1. A Co-based alloy product, comprising:
a polycrystal of a Co-based alloy;
a γ phase that is a matrix phase inside a crystal grain of the polycrystal;
segregated cells formed inside the crystal grain of the polycrystal in the γ phase that is a matrix phase, wherein the segregated cells have an average size of 1 μm or larger and 100 μm or smaller and contain Al and Cr of the Co-based alloy; and
a γ' phase coherently precipitated inside the crystal grain of the polycrystal,
wherein the Co-based alloy comprises a composition by mass % of:
0.001 mass %≤C<0.100 mass %;
13.5 mass %≤Cr<20.0 mass %;
2.0 mass %≤Al<5.0 mass %;
13.0 mass %≤W<20.0 mass %; and
39.0 mass %≤Ni<55.0 mass %,
with the balance being Co and unavoidable impurities.

2. The Co-based alloy product according to claim 1, wherein the Co-based alloy further comprises at least one element selected from the group consisting of:
Mo≤3.0 mass %;
Nb≤2.0 mass %;
Ti≤2.0 mass %; and
Ta≤2.0 mass %.

3. The Co-based alloy product according to claim 2, wherein the Co-based alloy further comprises at least one element selected from the group consisting of:
0.001 mass %≤B<0.020 mass %;
0.0001 mass %≤Zr<0.010 mass %;
Mg≤0.10 mass %; and
Ca≤0.20 mass %.

4. The Co-based alloy product according to claim 3, having a 0.2% proof stress at 800° C. of 650 MPa or higher.

5. The Co-based alloy product according to claim 3, having a tensile strength at 800° C. of 850 MPa or higher.

6. The Co-based alloy product according to claim 2, having a 0.2% proof stress at 800° C. of 650 MPa or higher.

7. The Co-based alloy product according to claim 2, having a tensile strength at 800° C. of 850 MPa or higher.

8. The Co-based alloy product according to claim 1, wherein the Co-based alloy further comprises at least one element selected from the group consisting of:
0.001 mass %≤B<0.020 mass %;
0.0001 mass %≤Zr<0.010 mass %;
Mg≤0.10 mass %; and
Ca≤0.20 mass %.

9. The Co-based alloy product according to claim 8, having a 0.2% proof stress at 800° C. of 650 MPa or higher.

10. The Co-based alloy product according to claim 8, having a tensile strength at 800° C. of 850 MPa or higher.

11. The Co-based alloy product according to claim 1, having a 0.2% proof stress at 800° C. of 650 MPa or higher.

12. The Co-based alloy product according to claim 1, having a tensile strength at 800° C. of 850 MPa or higher.

13. The Co-based alloy product according to claim 1, wherein the inside of the segregated cell comprises Co, Ni and W, and the boundary of the segregated cell comprises Al and Cr.

* * * * *